Patented Aug. 2, 1932

1,869,643

UNITED STATES PATENT OFFICE

OSCAR ADLER AND RUDOLF ADLER, OF KARLSBAD, CZECHOSLOVAKIA

PURIFICATION OF WATER

No Drawing. Original application filed July 9, 1926, Serial No. 121,491, and in Czechoslovakia July 15, 1925. Divided and this application filed July 13, 1929, Serial No. 378,172.

This invention relates to a process of purifying water, by which it is freed from germs and which, at the same time, results in pure water containing no free or active chlorine. This application is a division of our copending application Serial No. 121,491, filed July 9, 1926, Patent No. 1,771,518, dated July 29, 1930.

It has heretofore been proposed to remove the excess of free or active chlorine, remaining in the water, by the use of carbonaceous matter, or by active carbon, which chemically combines or fixes the chlorine, or adsorbs the same. But such processes present the objection that the carbonaceous material in the mass, as it chemically combines or adsorbs the chlorine, gradually loses its activity to do so and finally becomes entirely inert. On account of the possibility of free or active chlorine being, therefore, present in the purified water, it is necessary to constantly test the same for free chlorine. As soon as the capacity of the carbon or carbonaceous material to adsorb or combine the chlorine is exhausted, it must be replaced by fresh material or be revivified. In carrying out such processes, the added free or active chlorine must absolutely not be present in the pure water. According to the present invention, elementary carbon is used to render the free or active chlorine innocuous, but in carrying out the new process, the adsorption capacity of the carbon is of especial importance; elementary carbon does not, in fact, possess a chemical affinity for chlorine, as is well known. By elementary carbon is understood such carbons as lamp black, bone carbon, etc., which, as chemists well know, do not have the capacity of forming chemical chlorine compounds with chlorine dissolved in water.

In contradistinction to the prevalent scientific opinion, according to which elementary carbon is resistant at normal temperatures to dilute watery solutions of free or active chlorine, we have found that elementary carbon, after saturation with free chlorine in watery solution and in the case where the quantity of carbon used is large relatively to the amount of chlorine flowing over the surface of the carbon in a unit time, is subjected to a chemical reaction, which can be expressed by the following equations:

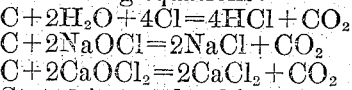
$C + 2NaOCl = 2NaCl + CO_2$
$C + 2CaOCl_2 = 2CaCl_2 + CO_2$

Stated in words, this means that the total amount of free or active chlorine, in passing through the carbon, is converted into the chlorine ions, without the carbon becoming saturated and, therefore, without the necessity of renewing or reactivating the carbon.

In the present process, therefore, in contradistinction to prior processes, the total amount of free or active chlorine used, after passing through the carbon, appears continuously as chlorine ions in the purified water.

The quantity of carbon required in the above described operation for the continuous and quantitative conversion into the chlorine ions, is dependent upon the kind used, and especially upon its surface area, and must be determined by experiment in each case. The numerous materials consisting of, or, in part, of carbon and found in commerce, such as hard coal, brown coal or the cokes made therefrom, are used for the most part, while soot, wood carbon, bone carbon, etc. and particularly the activated carbon, distinguished by its large surface area formation, are used to a less degree.

As disinfecting media, free chlorine in gaseous state or in watery solution, hypochlorite, chloride of lime, or other substances giving off free or active chlorine can be used in the usual way.

According to the present invention, therefore, the water to be freed from germs is first mixed with a quantity of free or active chlorine amply sufficient to surely kill all the germs, and then after a suitable time, is conducted over a sufficient quantity of any desired kind of carbon, the surface area of which is sufficiently great, after becoming saturated with chlorine, to convert the remaining excess of free or active chlorine quantitatively into the chlorine ions. The small amounts of carbon, used up in the said chemical process, must obviously be replaced from time to time.

Since in commerce different kinds of carbon, as for example, soot, active carbon and the like, are often obtainable in powder form, which presents a great resistance to the passage of water in large quantities and, therefore, are not suitable in many cases, it has proved advantageous to convert such powders into a granular state. This can be done in various well known ways, as for instance, by finely pulverizing the variety of carbon to be used and either mixing it into a stiff paste with a certain quantity of a plastic clay and water and heating the pieces thus formed, after drying them, to a temperature of from 800-1500°, under exclusion of oxygen, or mixing the powdered carbonaceous material with a watery solution of an alkali silicate, preferably with the addition of a substance containing silicic acid, such as quartz, clay, feldspar etc., into a thick paste and then, after suitably shaping it in the moist state, subjecting the pieces to a rapid heating at a moderate temperature.

It has also been discovered that a considerably enhanced disinfecting action also occurs when the water, after the addition of a definite quantity of free chlorine, a hypochlorite or chloride of lime, and before passing through the materials consisting of carbon of the kind described, is conducted through porous bodies refractory as regards the chlorine products mentioned and formed from pulverulent, granular or from any desired shaped substances which reduce or prevent completely the movement of the organisms present in the water, relatively to the velocity of flow of the water flowing through the porous bodies. Care must, however, be taken that the water still contains sufficient free chlorine, hypochlorite or chloride of lime, both during the passage through the porous bodies and also on leaving the same, so as to kill organisms present in the water or accumulating inside the porous bodies. Many materials which are refractory toward chlorine or the chlorine compounds mentioned such as clay, sand, asbestos, kieselguhr, glass-wool, and the like in pulverulent or granular form or shaped according to known methods as pieces, plates, tubes closed at one end, and the like, may be employed as the porous bodies.

In those cases in which the water being freed from organisms contains coarse suspended particles, the perviousness of the porous bodies might be decreased by the retention of these particles on or in the porous body so that the operation of the plant would be impaired or the flow of water brought to a complete standstill. To guard against this possible undesirable contingency, it has proved preferable to pass water in the direction opposite to that of the normal flow from time to time and as occasion demands, chlorine, hypochlorite or chloride of lime being added immediately at the commencement or preferably toward the end of this back flushing in quantities sufficient to destroy any organisms still possibly remaining in the porous body.

As mentioned, the water now leaving the porous bodies, free from organisms but still containing considerable chlorine, hypochlorite or chloride of lime, is passed over materials consisting substantially of carbon of the kind described, whereby in consequence of the described conversion of the chlorine, hypochlorite or chloride of lime the water is quantitatively freed from these. Since, however, the possibility that bacteria might on occasion escape destruction and be retained by the carbon-containing material is not excluded, it has been found preferable to sterilize these carbon-containing materials from time to time and as occasion demands, by means of steam, hot air or hot water so as to kill any organisms which might be situated therein.

We claim as our invention:—

A method of freeing water from organisms, which comprises the steps of mixing the water with a substance containing chlorine; passing the water through porous refractory substances which prevent the movement of the organisms situated in the water; then conducting the water over a material containing carbon to convert the chlorine substance into a chlorine compound; and flushing out any solid particles accumulated in the porous bodies by a stream of water treated with a substance containing chlorine in a direction opposite to that of the normal flow of water to kill the organisms present in the porous bodies.

In testimony whereof we affix our signatures.

OSCAR ADLER.
RUDOLF ADLER.